United States Patent
Wolf

[11] Patent Number: 6,124,791
[45] Date of Patent: Sep. 26, 2000

[54] SAFETY SWITCHING DEVICE FOR AN ELECTROMOTIVE GARDEN APPLIANCE

[75] Inventor: Gregor Wolf, Betzdorf, Germany

[73] Assignee: Wolf-Geräte GmbH Vertriebsgesellschaft KG, Betzdorf, Germany

[21] Appl. No.: 09/011,350

[22] PCT Filed: Jul. 31, 1996

[86] PCT No.: PCT/EP96/03373

§ 371 Date: May 19, 1998

§ 102(e) Date: May 19, 1998

[87] PCT Pub. No.: WO97/04635

PCT Pub. Date: Feb. 13, 1997

[30] Foreign Application Priority Data

Aug. 2, 1995 [DE] Germany ................... 195 28 427

[51] Int. Cl.⁷ ........................................ G08B 1/08
[52] U.S. Cl. ................. 340/539; 367/197; 56/102 A; 56/10.8
[58] Field of Search ................... 340/539, 648, 340/686.1, 687; 367/197; 56/10.2 R, 10.2 A, 10.8

[56] References Cited

U.S. PATENT DOCUMENTS

| | | | |
|---|---|---|---|
| 4,145,864 | 3/1979 | Brewster, Jr. | 56/10.8 |
| 4,964,265 | 10/1990 | Young | 56/10.2 |
| 5,293,712 | 3/1994 | Lo | 43/26.1 |
| 5,351,778 | 10/1994 | Shigemi et al. | 180/167 |
| 5,749,207 | 5/1998 | Coats | 56/10.2 A |

FOREIGN PATENT DOCUMENTS

| | | |
|---|---|---|
| 2348644 | 11/1977 | France . |
| 2626201 | 12/1977 | Germany . |
| 2723561 | 11/1978 | Germany . |
| 3332192 | 3/1985 | Germany . |
| 9409312 | 6/1995 | Germany . |

*Primary Examiner*—Daryl Pope
*Attorney, Agent, or Firm*—Ostrolenk, Faber, Gerb & Soffen, LLP

[57] ABSTRACT

In an electromotively driven garden appliance, for example a lawnmower or a lawn-aerator, the on-off switch is usually arranged on the handle-bar such that it can easily be accessed for operation. This on-off switch is connected via a cable to the motor circuit, the cable being guided along one branch of the handle-bar. According to the invention, in order to avoid damage to the cable and resultant unreliable contact-making when the handle-bar is folded down, the cable is replaced by a wireless connection, in particular by infrared radiation, radio or ultrasound. For this purpose, a transmitter is assigned to the electrical on-off switch and a receiver on the chassis is assigned to the motor circuit. The wireless transmission according to the invention can easily be combined with the dead man's switch which is prescribed for garden appliances and can take the form of a proximity switch or touch-contact switch and may be arranged on the handle-bar such that the appliance is switched off when the handle-bar is released.

26 Claims, 1 Drawing Sheet

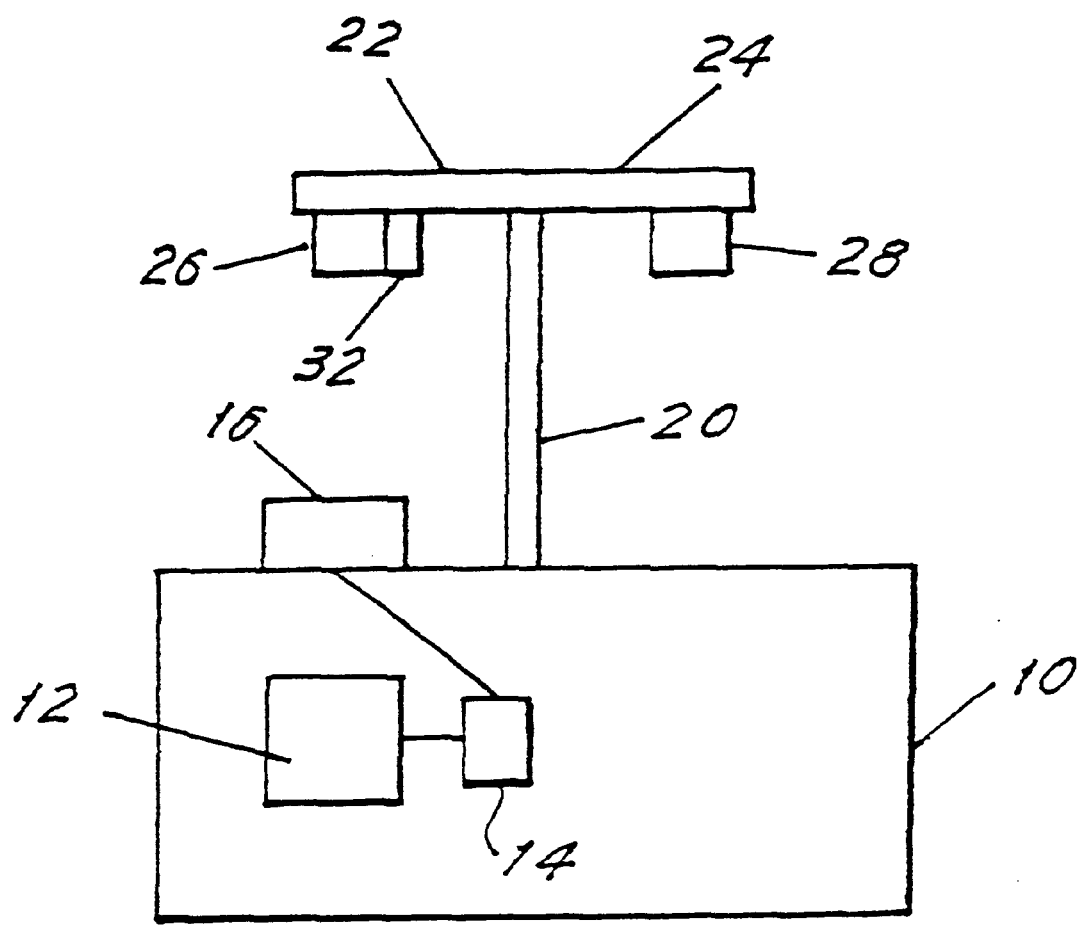

SAFETY SWITCHING DEVICE FOR AN ELECTROMOTIVE GARDEN APPLIANCE

BACKGROUND OF THE INVENTION

The invention relates to a safety switching device for a motor-driven garden appliance, for example a lawnmower or a lawn-aerator, with an actuating element arranged on the handle-bar.

Such a safety switching device is disclosed by the applicant's Swiss patent 618 578. In this case, the actuating element arranged on the handle-bar is designed as a sensor switch which brings about electrical contacting when the handle-bar is grasped as intended by the hand (or by both hands). These actuating elements are connected via control lines (not represented in the drawing) to a switching unit 16 in the vicinity of the motor block. As in the case of the actuating elements on the handle-bar, which act directly on a network-power switch which is arranged on the handle-bar and is connected via electrical lines to the motor, in the case of the known garden appliance the control lines are also arranged in a freely suspended manner and are thus exposed to damage whenever the garden appliance is pushed past sharp edges or other obstacles or is put away in storage.

To be able to accommodate a garden appliance in a space-saving manner when not in use, the handle-bar is generally provided with a hinged joint which makes it possible to swing the projecting part of the handle-bar over the lawnmower or the like in such a way that the space requirement is determined substantially by the dimensions of the chassis.

In the case of such appliances, the cable leading to the switch is guided along one leg of the handle-bar and is fixed on the latter by clips. The cable must therefore follow the swinging movement when the handle-bar is collapsed and extended, which over a period of time may lead to the cable being damaged, in particular when the cable is inadvertently pinched repeatedly in the parts of the joint.

U.S. Pat. No. 964 265, cited in opposition, shows a self-propelled, wheel-driven lawnmower which is driven by a battery-operated motor. In the case of this known lawnmower, no handle-bar is provided, because the guiding of the lawnmower is to be performed by a remote control, the transmitter of which is assigned to the operator and the receiver of which is united with the self-propelled lawnmower. This remote control, which not only brings about the switching on and off of the motor but also has to perform controlling functions for the wheels, is preferably formed by a multi-channel remote-control means of the kind which is customary for remote-controlled model aircraft. The problem of motor switching from a handle-bar does not exist here.

OBJECTS AND SUMMARY OF THE INVENTION

The invention is therefore based on the object of designing a safety switching device of the generic type for a garden appliance in such a way that the switching function from the handle-bar remains reliably ensured, and the risk of damaging the cable is excluded.

DETAILED DESCRIPTION OF THE PREFERRED EMBODIMENT(S)

The set object is achieved by an actuating element on the handle-bar being combined with a transmitter which wirelessly transmits switch signals to a receiver combined with a motor switch. The fact that the transmission of the switching-on signal takes place wirelessly means that it is possible to dispense with a cable between the handle-bar and the motor. The wireless transmission may expediently take place by infrared radiation or similar known methods, and numerous means of transmission with very small dimensions are commercially available for this purpose, it having to be taken into consideration that only very small amounts of energy are required because of the short distance between transmitter and receiver.

An embodiment of the invention is schematically illustrated in the drawing FIGURE. It includes a lawn mower 10 conventionally driven by an electric motor 12 which is connected to a switching device 14 which is operated to turn the motor on and off. A signal receiver 16 on the lawn mower is connected with the switching device, and when the receiver receives the appropriate signal, it operates the switching device to operate the motor.

A handle-bar 20 extends up from the lawnmower 10 and includes graspable hand grip portions 22 and 24. A remote control signal transmitter 26 on handle-bar portion 22 is operable to wirelessly transmit a signal to the receiver 16 on the lawnmower.

The arrangement is expediently set up in such a way that the switching device assigned to the receiver keeps the motor circuit closed until the receiver receives a second, switching-off signal, different from the switching-on signal. This would mean, however, that, if the beam is interrupted inadvertently, the motor keeps running even if a switching-off signal is emitted but does not reach the receiver. This risk of interruption exists in the case of infrared transmission just as it does in the case of ultrasound transmission, but not in the case of radio transmission.

For reasons of safety, it may therefore be expedient to design the receiver in such a way that it leaves the switch assigned to it in the switched-on position only as long as it is receiving the switching-on signal from the transmitter. Inadvertent interruption of the beam would then lead only to switching off, and once the radiation is no longer being interrupted the motor could be started again by a re-entered switching-on signal.

Such a switching arrangement with wireless transmission on the path between handle-bar and chassis can easily be combined with the dead man's switch which is prescribed for garden appliances. According to current practice, this dead man's switch 28 is generally designed as a grip on the handle-bar 22 which has to be pulled after pressing the on-off switch 26 on the handle-bar 27 and has to be held by one hand or both hands in order to keep the circuit closed.

According to a further development of the invention, it is provided for this dead man's switch to take the form of a touch-contact switch or proximity switch on the handle-bar in such a way that, when it is touched with the hand, a circuit remains closed (or open) in order to keep the motor switched on, whereas releasing the handle-bar has the effect of immediately switching off the motor circuit, in that either the transmitter is switched off and no longer supplies a switching-on signal or the transmitter is made to supply a switching-off signal.

The current for powering the sensor may be taken from a small battery 32 which can be accommodated in the switch housing on the handle-bar together with the sensor.

The beam between transmitter 26 and receiver 16 may be highly concentrated by simple means, so that transmission can only take place when the handle-bar has been transferred into the operating position illustrated, but not while it is in the collapsed position. This achieves the additional safety function, that in the collapsed state the motor circuit is not influenced by a switching function on the handle-bar, because the beam emitted does not reach the receiver.

The invention can be used both for network-operated appliances and for battery-operated appliances. In a correspondingly modified form, the invention may also be used for garden appliances which are driven by a combustion engine, it being possible, for example, to replace the Bowden cable for throttle adjustment, which in the same way can be subjected to damage when the handle-bar is folded down.

What is claimed is:

1. A safety switching device for a motor-driven garden appliance comprising:

a motor in the appliance;

a handle-bar on the appliance; and an actuating element arranged on the handle-bar;

wherein the actuating element on the handle-bar is combined with a transmitter which wirelessly transmits switching signals to a receiver, a motor switch is disposed in the vicinity of the motor, and the receiver is combined with the motor switch.

2. The safety switching device according to claim 1, wherein the transmitter and the receiver are adapted to transmit and receive the switching signals which are transmitted by infrared radiation, radio or ultrasound.

3. The safety switching device according to claim 1, further comprising a battery arranged on the handle-bar for powering the transmitter.

4. The safety switching device according to claim 1, further comprising a dead man's switch so operable and so connected with the motor switch that the dead man's switch has to be grasped and held in order to switch on the motor switch and to keep the motor switch in the switched-on position, wherein the dead man's switch has an actuating element in the form of a touch-contact switch which is integrated in the handle-bar.

5. The safety switching device according to claim 3, wherein the touch-contact switch is also combined with the transmitter such that the transmitter transmits a switching-off signal to the receiver as soon as the touch-contact switch or switches is/are released.

6. The safety switching device according to claim 1 wherein the handle-bar is movable between a use position at which the appliance is operable by the handle-bar, and a non-use position wherein the appliance is not normally operable with the handle-bar in the inoperable position;

the transmitter directing a signal to the receiver and the receiver being so placed for receiving the directed signal that a signal transmitted by the transmitter to the receiver is received by the receiver when the handle-bar is in the use position, and wherein a signal transmitted by the transmitter is not received by the receiver when the handle-bar is in the non-use position.

7. The safety switching device as claimed in claim 1 wherein the appliance is one of a lawnmower and a lawn-aerator.

8. The safety switching device as claimed in claim 1 wherein the transmitter is mounted on the appliance.

9. A safety switching device for a motor-driven garden appliance comprising:

a motor in the appliance;

a handle-bar on the appliance; and an actuating element arranged on the handle-bar;

wherein the actuating element on the handle-bar is combined with a transmitter which wirelessly transmits switching signals to a receiver, a motor switch is disposed in the vicinity of the motor, and the receiver is combined with the motor switch; said safety switching device further comprising a dead man's switch so operable and so connected with the motor switch that the dead man's switch has to be grasped and held in order to switch on the motor switch and to keep the motor switch in the switched-on position, wherein the dead man's switch has an actuating element in the form of a touch-contact switch which is integrated in the handle-bar.

10. The safety switching device according to claim 9, wherein the transmitter and the receiver are adapted to transmit and receive the switching signals which are transmitted by infrared radiation, radio or ultrasound.

11. The safety switching device according to claim 9, further comprising a battery arranged on the handle-bar for powering the transmitter.

12. The safety switching device according to claim 9 wherein the handle-bar is movable between a use position at which the appliance is operable by the handle-bar, and a non-use position wherein the appliance is not normally operable with the handle-bar in the inoperable position;

the transmitter directing a signal to the receiver and the receiver being so placed for receiving the directed signal that a signal transmitted by the transmitter to the receiver is received by the receiver when the handle-bar is in the use position, but a signal transmitted by the transmitter is not received by the receiver when the handle-bar is in the non-use position.

13. The safety switching device as claimed in claim 9 wherein the appliance is one of a lawnmower and a lawn-aerator.

14. The safety switching device as claimed in claim 9 wherein the transmitter is mounted on the appliance.

15. A safety switching device for a motor-driven garden appliance comprising;

a motor in the appliance;

a handle-bar on the appliance; and an actuating element arranged on the handle-bar; wherein the actuating element on the handle-bar is combined with a transmitter which wirelessly transmits switching signals to a receiver, a motor switch is disposed in the vicinity of the motor, the receiver is combined with the motor switch, a battery is arranged on the handle-bar for powering the transmitter; and wherein the touch-contact switch is also combined with the transmitter such that the transmitter transmits a switching-off signal to the receiver as soon as the touch-contact switch or switches is/are released.

16. The safety switching device according to claim 15, wherein the transmitter and the receiver are adapted to transmit and receive the switching signals which are transmitted by infrared radiation, radio or ultrasound.

17. The safety switching device according to claim 15, further comprising a dead man's switch so operable and so connected with the motor switch that the dead man's switch has to be grasped and held in order to switch on the motor switch and to keep the motor switch in the switched-on position, wherein the dead man's switch has an actuating element in the form of a touch-contact switch which is integrated in the handle-bar.

18. The safety switching device according to claim 15 wherein the handle-bar is movable between a use position at which the appliance is operable by the handle-bar, and a non-use position wherein the appliance is not normally operable with the handle-bar in the inoperable position;

the transmitter directing a signal to the receiver and the receiver being so placed for receiving the directed signal that a signal transmitted by the transmitter to the receiver is received by the receiver when the handle-bar is in the use position, but a signal transmitted by the transmitter is not received by the receiver when the handle-bar is in the non-use position.

19. The safety switching device as claimed in claim 15 wherein the appliance is one of a lawnmower and a lawn-aerator.

20. The safety switching device as claimed in claim 15 wherein the transmitter is mounted on the appliance.

21. A safety switching device for a motor-driven garden appliance comprising:

a motor in the appliance;

a handle-bar on the appliance, and actuating element arranged on the handle-bar;

wherein the actuating element on the handle-bar is combined with a transmitter which wirelessly transmits switching signals to a receiver, a motor switch is disposed in the vicinity of the motor, wherein the receiver is combined with the motor switch, the handle-bar is movable between a use position at which the appliance is operable by the handle-bar, and a non-use position wherein the appliance is not normally operable with the handle-bar in the inoperable position; and the transmitter directs a signal to the receiver and the receiver is so placed for receiving the directed signal that a signal transmitted by the transmitter to the receiver is received by the receiver when the handle-bar is in the use position, but a signal transmitted by the transmitter is not received by the receiver when the handle-bar is in the non-use position.

22. The safety switching device according to claim 21, wherein the transmitter and the receiver are adapted to transmit and receive the switching signals which are transmitted by infrared radiation, radio or ultrasound.

23. The safety switching device according to claim 21, further comprising a battery arranged on the handle-bar for powering the transmitter and wherein the touch-contact switch is also combined with the transmitter such that the transmitter transmits a switching-off signal to the receiver as soon as the touch-contact switch or switches is/are released.

24. The safety switching device according to claim 21, further comprising a dead man's switch so operable and so connected with the motor switch that the dead man's switch has to be grasped and held in order to switch on the motor switch and to keep the motor switch in the switched-on position, wherein the dead man's switch has an actuating element in the form of a touch-contact switch which is integrated in the handle-bar.

25. The safety switching device as claimed in claim 21 wherein the appliance is one of a lawnmower and a lawn-aerator.

26. The safety switching device as claimed in claim 21 wherein the transmitter is mounted on the appliance.

* * * * *